United States Patent [19]

Bauer et al.

[11] Patent Number: 4,805,481
[45] Date of Patent: Feb. 21, 1989

[54] SELF-LOCKING REVOLUTE JOINT, ADJUSTABLE TO AN ANGLE BY MOVING AN ACTIVATION LEVER BACK AND FORTH

[75] Inventors: Heinz Bauer; Burckhard Becker; Ernst-Reiner Frohnhaus; Alfred Gedig, all of Solingen; Josef Klink, Nagold; Antonin Koucky, Sindelfingen, all of Fed. Rep. of Germany

[73] Assignees: C. Rob. Hammerstein GmbH; Daimler-Benz AG, both of Fed. Rep. of Germany

[21] Appl. No.: 50,286

[22] Filed: May 14, 1987

[30] Foreign Application Priority Data

May 14, 1986 [DE] Fed. Rep. of Germany ....... 3616290

[51] Int. Cl.⁴ .................. G05G 5/06; F16H 27/02; F16H 31/00
[52] U.S. Cl. ........................ 74/528; 74/143; 74/473 R; 74/527
[58] Field of Search ........... 74/528, 530, 473 R, 74/503, 529, 143, 523, 527, 519

[56] References Cited

U.S. PATENT DOCUMENTS

| | | | |
|---|---|---|---|
| 3,377,874 | 4/1968 | Scott | 74/143 |
| 3,472,087 | 10/1969 | Ylinen | 74/143 |
| 3,626,452 | 12/1971 | Winter | 74/143 |
| 3,627,253 | 12/1971 | Germain | 74/527 |
| 3,800,614 | 4/1974 | Johnson | 74/143 |
| 3,874,248 | 4/1975 | Hauser et al. | 74/143 |
| 3,981,473 | 9/1976 | Nagai | 74/527 |
| 4,112,278 | 9/1978 | Greiner et al. | 74/143 |
| 4,515,029 | 5/1985 | Reynolds et al. | 74/473 R |
| 4,529,077 | 7/1985 | Renaud | 74/473 R |
| 4,552,031 | 11/1985 | Barbagli | 74/473 R |
| 4,646,582 | 3/1987 | Kijima | 74/473 R |

Primary Examiner—Richard E. Moore
Assistant Examiner—Vinh Luong
Attorney, Agent, or Firm—Steele, Gould & Fried

[57] ABSTRACT

The self-locking revolute joint can be adjusted at angles by turning an activation lever back and forth. It has a mount in which a bearing shaft rests rotatably in bearings, and supports an adjustment wheel which is provided with tooth profiles. The activation lever can be turned in both rotational directions around a turning axle resting in bearings in the mount; it has two swing-out carriers which do not engage with the adjustment wheel when the activation lever is in its central position; when the activation lever is turned, one of them engages with an adjacent tooth profile of the adjustment wheel and brings it to turn. Further, two locking arms rest rotatably in bearings at the mount and lock and adjustment wheel when the activation lever is in its central position. Each one of two radial cams arranged on the activation arm confunctions with a locking arm, via a release arm. When the activation lever is turned out of the central position, one radial cam brings the related release arm along and thus disengages the locking arm in the momentary drive direction.

10 Claims, 1 Drawing Sheet

SELF-LOCKING REVOLUTE JOINT, ADJUSTABLE TO AN ANGLE BY MOVING AN ACTIVATION LEVER BACK AND FORTH

The invention refers to a self-locking revolute joint, adjustable to an angle by moving an actuation or hand lever back and forth, particularly for adjustment of seat height or backrest inclination of vehicle seats, with a mount, in which a bearing shaft rests in bearings so that it can be turned, supporting an adjustment wheel provided with tooth profiles and having a rotation connection with the adjusting arm of the revolute joint, with a turning axle, around which the actuation lever can be turned from a central position into both turning directions and which is located outside the adjustment wheel, whereby the actuation lever is provided with two carriers, which, in the central position of the actuation lever, do not engage with the adjustment wheel, and of which a first engages an adjacent tooth profile of the adjustment wheel, turning it when the actuation lever is turned, and with at least one locking arm capable of moving in bearings on the mount, which locking arm, when the actuation lever is in the central position, rests elastically on one tooth profile of the adjustment wheel, locking it and not disengaging until the activation lever is turned.

In the revolute joint, previously known from the German Disclosure Document DE-OS NO. 34 09 144, the movement of the adjustment wheel in relation to the mount is acheieved by turning back and forth, i.e. by means of pumping movements of the activation lever. The movements resemble those of a ratchet screwdriver. Thereby, the movements of the activation lever are limited to a small angle range of e.g. ±30°, so that this can be arranged with economy of space and favorably for the user, particularly with respect to ease of handling and ergonometry. Thereby, the initially mentioned adjustment device is particularly suitable for manually activated revolute joints.

Normally, the activation lever is in its central position, in which it is preferably held by means of a centering spring. In this position, it does not influence the adjustment wheel; the latter is locked by at least one locking arm; the locking arm assumes the locking position independently and must be turned away from the locking position against the force of a locking spring if an adjustment movement of the adjustment wheel is to be initiated.

The activation lever may be relatively long, whereby a major and user-friendly power transfer of the manually activated adjustment forces is achieved. In the previously known revolute joint, the free end of the activation lever is hinged to a coupled rocker, the other end of which rests in a bearing in the mount. A spring holds the coupled rocker and the activation lever in an extended position.

Further, a revolute joint is known from the French Pat. No. FR-PS 72.44 561 (2.210.953), in which an activation lever supporting two carriers can be swung in between tooth profiles of an adjustment wheel; however, this revolute joint is not self-locking. The same applies to the revolute joint known from the German Disclosure Document No. DE-OS 31 15 942, according to which the activation lever can be turned around the bearing axle and also supports two carriers, each one with its own assigned adjustment wheel. According to the present invention, the concept of "self-locking" is understood to mean that the revolute joint provides independent locking of the return flow path of the force as soon as the activation lever is released. Thereby, the locking is acheived by engagement of the locking arm with the adjustment wheel, so that self-locking gears etc., as known e.g. from the German Patent Specification No. DE-AS 12 97 496, are not needed. In the return flow path of the force, forces can thus influence the revolute joint so that the vehicle seat equipped with a revolute joint may be affected by the weight or the movements of a passenger or by the acceleration forces affecting a passenger during driving.

On the basis of the previously known revolute joint of the nature initially mentioned, the purpose of the invention is to avoid the disadvantages of this revolute joint and to develop it further so that it tends to clatter less during actual driving, facilitates an initiation of the adjustment forces which is more noticeable than the prior art devices and hence advantageous to the driver, permits a greater play with respect to translation, and is more efficient.

With the self-locking revolute joint of the nature mentioned initially, this problem is solved by the following features that the turning axle of the actuation lever rests in a bearing in the mount, that each carrier is linked to the actuation lever and rotatable around a carrier axle, around which it can be turned without touching the tooth profiles of the adjustment wheel when the hand lever is in a central position, whereby a stop on the actuation lever is assigned to each carrier, preventing the carrier from being disengaged from the adjacent tooth profile of the adjustment wheel, that two radial cams are arranged on the actuation lever, that two locking arms are provided, each one of which locks only in one turning direction but slides over the tooth profiles of the adjustment wheel in the other direction, and that a release arm is assigned to each locking arm, release arm catches on a radial cam when the actuation lever is moved out of the central position, whereby the release arm is brought along and disengages the related locking arm which is locking in the related drive direction.

Thus, the actuation lever rests directly in a bearing on the mount, whereby, on one hand, acceleration forces acting on the actuation lever during driving are favorably counteracted, and clattering as well as vibration of the actuation lever can be better controlled, and, on the other hand, the user feels a defined turning axis when moving the actuation lever back and forth, so that the movements affected by the activation force are carried out on a precise, predetermined movement path, namely a circular path around the turning axis.

By means of the rotatable arrangement of the carriers on the actuation lever, it is ascertained that the carrier can slide over at least one tooth profile in the non-drive return movement of the actuation lever, without cancelling the previously achieved adjustment movement. Thus, between the actuation lever and the adjustment wheel, there are relationships similar to those of two engaging toothed wheels, whereby the actuation lever is to be regarded as a toothed wheel with only one tooth which, after a force-affected movement in one direction, can slide over at least one tooth of the other toothed wheel (adjustment wheel) in the return movement, so that there is no more engagement in the return movement.

When a turning movement brings the actuation lever out of its central position, the radial cams arranged on the actuation lever serve to transfer the movements occurring thereby via one of the release arms to the related locking arm, so that, from its normally locking position, the latter arrives in a release position.

Thereby, the design problem of the interaction of the radial cams with the release arm is solved in such a manner that, when the turning movement of the actuation lever begins, the release arm is first carried along but subsequently freed from the radial cam so that the locking arm is again resting elastically on the circumference of the adjustment wheel, ready to engage but not yet locking the turning movement of the adjustment wheel. However, when the turning movement is continued, it engages in the next tooth profile and thus locks the setting art, whereby the movement of the actuation lever is also stopped. In the return movement, the radial cams again slide into a position engaging the related release arm, whereby they briefly move the latter without moving the locking arm.

Contrary to the previously known revolute joint of the nature initially mentioned, the revolute joint according to the invention has a functional separation between the functions of drive, which is assumed by the carriers, and locking, which is achieved by means of the radial cams, the release arms, and the locking arms. Consequently, the carriers can turn around their carrier axle without influencing the movements of the locking components. Thus, each component can be optimally adjusted to its actual function.

In practical applications, the drive crafts are initiated almost exclusively tangentially to the adjustment plate, so that those components of the adjustment force which fall on the bearing shaft are clearly reduced as compared with the previously known self-locking revolute joint. In comparison thereto, the translation, i.e. the ratio of turning angle of the actuation lever to the achieved turning angle of the adjustment wheel, can also have greater intervals, since the distance of the carriers from the turning axis of the actuation lever can be varied within wider limits; at least, one is not—as in the case with the previously known revolute joint—forced to make this distance greater than the outside radius of the adjustment wheel.

In a preferred further development of the invention, the carriers, the radial cams, the locking arms, and the release arms are located in mirror symmetry with the line connecting the turning axis and the axis of the bearing shaft when the actuatio lever is in its central position. Thus, both carriers, etc. can be identically manufactured parts, and it is not necessary to manufacture two different carriers or locking arms, etc. Further, the symmetrical arrangement allows equal ratios for the movement actions in both turning directions, so that a user can make the adjustments in both directions under equal conditions and without differences.

In another further development, the locking arms are double arms, whereby the first arm forms the locking surface, while the assigned release arm is connected to the second arm. This arrangement facilitates a simple design solution for the initiation of the unlocking movement to be transferred via the radial cams to the locking arm. By means of the specifically selecting the lengths of the two arms of the double locking arms, it is possible to precisely and independently predetermine that translation of the turning angle of the radial cams which is necessary for unlocking other movement processes in the revolute joint.

In an additional, preferred execution, each release arm has a carrier projection, the inner profile of which lies slightly ahead of the related radial cam when the actuation lever is in its central position, whereby, when the release arm is carried along when the actuation lever begins to turn, the radial cam slides over the inner profile, thus releasing the release arm upon the turning of the lever. Thereby, it is achieved that the locking arm can be in a position ready for locking even before the adjusting movement of the adjustment lever has been completed.

It is also suggested, as a further development, that the outer profile of the carrier projection is designed so that during the non-adjusting return movement, the radial cam touching this outside profile can press the projection towards the side and thus turn the release arm without influencing the locking arm, so that the radial cam regains contact with the inner profile of the carrier projection. Hereby, those geometric conditions are restored which exist initially, prior to an adjustment movement.

In a preferred further development of the invention, it is suggested that a blocking projection be arranged on the release arm, located outside the outside circumference of the adjustment wheel when the release arm is in its idle position, and, when the radial cam pulls the release arm, arriving into the movement circle of the tooth profiles of the adjustment wheel when the locking arm is just released. Thereby one prevents a force occurring in the return flow path of the force during an adjustment movement from applying a load in the same turning direction as the intended adjustment movement, whereby the adjustment wheel might turn freely. Rather, the load is captured by the blocking projection, and the free turning movement of the adjustment wheel is thus prevented.

BRIEF DESCRIPTION OF THE DRAWINGS

Additional advantages and characteristics of the invention can be found in the appended claims as well as in the following, not to be restricted, detailed description of the invention, which will be explained with reference to the following drawings which show:

DETAILED DESCRIPTION

Figure 1:
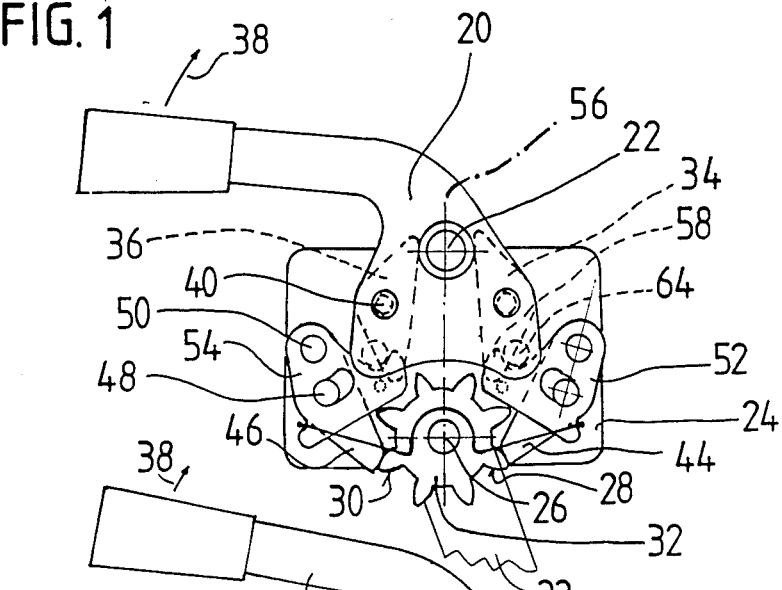
FIG. 1 a schematic top view of a revolute joint; the actuation lever is in the central position, the joint is locked, FIG. 2 a representation corresponding to that in FIG. 1, but the actuation lever is now turned angularly displaced or sufficiently to release the right hand locking arm, the right hand carrier rests on an adjacent tooth profile, and the adjusting portion of the movement stroke can take place, and FIG. 3 a representation corresponding to FIG. 1 but for the condition of the lever and joint at the end of a movement stroke, the locking is reestablished; this condition is followed by a return movement stroke.
Figure 2:
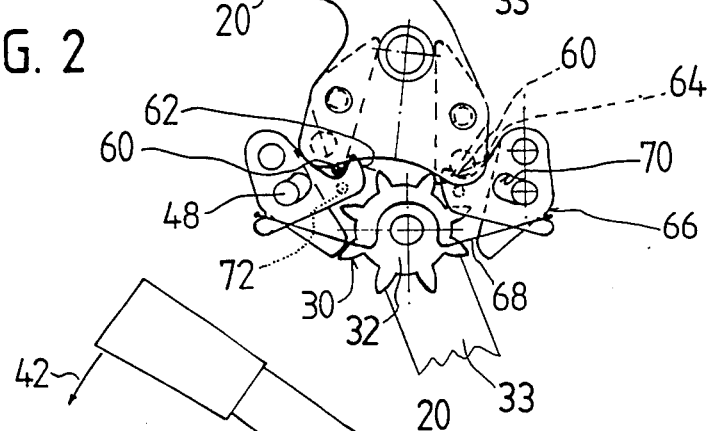

The self-locking revolute joint shown in the figures has an actuation or hand lever 20, which can be turned approximately 30° left and right of the central position shown in FIG. 1, namely around a turning axle 22. The turning axle 22 rests in bearings in a mount 24, which is schematically indicated in FIG. 2. In this mount 24, a bearing shaft 26 is also arranged in such a manner that an adjustment wheel 32 provided with tooth profiles 28, 30, can turn around the axis of the bearing shaft 26. The bearing shaft 26 is rotatably connected to a revolute joint arm that is arm 33 to be moved, the angle position of which in relation to the mount 24 can be adjusted by the revolute joint.

It its setting area below the turning axle 22, the actuation or hand 20 has two approximately triangular carriers, 34, 36, the lower, free end areas of which are designed as projections. In the representation according to FIG. 1, the carriers 34, 36 do not engage with the tooth profiles 28, 30 of the adjustment wheel 32, but their projections are in the immediate vicinity of the tooth profiles 28, 30. If the wheel moves in a counterclockwise manner, profile 28 is the leading edge of the tooth and is in front of carrier 34 and profile 30 is the lagging edge of the tooth and is behind the carrier. The projections of the two carriers 34, 36 are located on a circle line around the turning axle, close to the circle formed by the path of the base of the adjustment wheel 32. Thus, the relationships here are analogous with those of two combining toothed wheels, whereby the upper toothed wheel is formed by the adjustment arm of the lever 20 and its two carriers 34, 36.

If the actuation or hand lever 20 is pulled upwards from the central position shown in FIG. 1, in the direction of the arrow 38, the projection of the right hand carrier 34 engages with the adjacent tooth profile 28; this condition is shown in FIG. 2. When the movement is continued in the direction of the arrow 38, the adjustment wheel is turned counterclockwise, i.e. the actual turning process follows. This process is concluded in FIG. 3.

Each of the carriers 34, 36 is rotatably linked to the setting arm of the lever 20. Their projections are pressed away from each other by means of a carrier spring which is not shown in the figures; their upper end areas rest on the turning axle 22, thereby achieving the stable normal position of the carriers 34, 36 shown in the figures. This normal position remains unchanged during the adjustment process described above; the adjustment forces activated via the projection of the right hand carrier 34 do not turn the carrier 34 because the upper end area thereof rests against the turning axle 22.

The turning capability of the carriers 34, 36 is not needed for the forward movement in the direction of the arrow 38 as shown in the figures, but for the subsequent counterdirectional movement. As soon as this counterdirectional movement is initiated (arrow 42) from the position shown in FIG. 3, the projection of the right hand carrier 34 at first moves freely along the described circular arc, until it touches the rear tooth profile of the next tooth, in the adjustment direction, of the adjustment wheel 32. However, it cannot carry out any adjustment movement, since the setting wheel is locked against a clockwise turning. Rather, the carrier 34 turns clockwise around its carrier axle 40 and slides over the tooth. This is possible, since the geometrical relationships are selected so that, in the representation according to FIG. 1, the turning circle of the projection of the carrier 34 around its carrier axle 40 does not touch the outside circle line of the setting wheel 32 but is located outside of this circle line. Consequently, the right hand carrier returns to the position shown in FIG. 1.

In the described adjustment movement, the left hand carrier 36 has merely carried out a free, unobstructed movement; after a complete forward movement in the direction of the arrow 42, it has also returned to the position shown in FIG. 1. A turning movement of the lever 20 in the direction opposite to that of the arrow 38 causes a completely analogous progress of movements, but this time, the transport is affected by the left hand carrier 36.

So far, the description has referred only to the actual adjustment process, in the following, it will be explained how the locking of the setting or adjustment wheel 32 is released and subsequently re-locked in conjunction with this adjustment process:

For each turning direction, a locking arm 44, 46 is provided, each one rotatably linked around a locking arm axle 48 on the mount 24. The right hand locking arm 44 is assigned to the rear tooth profiles 30, the left hand locking arm 46 co-functions with the front tooth profiles 28. When the activation lever is in the central position (FIG. 1), both locking arms 44, 46 rest against one tooth profile, 30 and 28, respectively, due to a spring which will be described later. This contact extends along a profile which is basically perpendicular to a tangent at the point of contact. This precludes the possibility that the locking arms might swing out of the engagement independently, e.g. if a rotating force affects the setting wheel (in the return flow path of the force).

Above their locking arm axle 48, the locking arms are lengthened and formed; at this point, a release arm 52, 54 is linked rotatably around a joint 50 for arm 54. Each arm is approximately L-shaped and has an upward-pointing projection 58 for arm 52 located closer to the line 56 extending between the turning axle 22 and the bearing shaft 26. Each one has an inner profile 60 (FIG. 2) and an outer profile 62. With each one, there is a cofunctioning carrier cam 64; at the setting arm of the lever 20 there are a total of two carrier cams 64. In the representation according to FIG. 1, both carrier cams 64 are closely adjacent the inner profile 60 of the related release arm 52. Arm 54 is also adjacent the respective carrier cam. The progression of the inner profile 60 through each point of contact with the carrier cam 64 generally corresponds to a circle around the bearing point 50, so that it is ascertained that, when the locking arm (44, 46) is activated, the carrier cams move around the locking arm axle until they pass the self-locking angle at the inner profile of the release arm.

Figure 3:
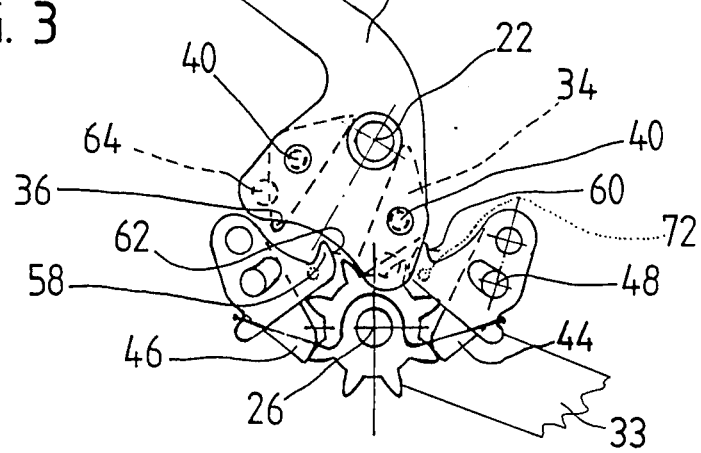

If, according to the representation in FIG. 1, the actuation lever 20 is turned in the direction of the arrow 38, the right hand carrier cam 64 remains in contact with the inner profile 60; however, with increasing turning movement, the angle of contact decreases until it is finally less that the self-locking angle, so that the right hand carrier cam 64 slides down from the inner profile 60 and completely releases or escapes the projection 58, whereby the position depicted in FIG. 3 is assumed.

Thus, in the described forward movement, the right hand carrier cam 64 initially affects a pull on the release arm 52, but the corresponding force is interrupted during the continuing turning movement. Thereby, the locking arm 44 linked with the release arm is at first pulled out of its locking position, the condition shown in FIG. 2; subsequently, however, it turns again in the direction towards the setting wheel 32 and is ready to engage. However, it does not make contact with the rear tooth profile 30 of the subsequent tooth if the end position of the movement has been reached, as shown in FIG. 3. Then, it perceivably limits the forward movement by the user, who carriers out the forward movement or releases the lever 20 so that the latter swings back into the central position shown in FIG. 1, namely under the effect of its own resetting spring.

Each one of the locking arms 44, 46 is round on the inside. The effect thereof is that locking arm which does not provide the locking in the respective adjustment movement—in the described case, the left hand locking arm 46—can slide over the subsequent tooth and make contact with the front tooth profile 28 of the subsequent tooth.

The release arms 52, 54 have outside indentations 66, located below the locking arm axle 48 and joint 50, and enclosed by the ends of a tension spring 68, which pulls the indentations 66 towards one another. On one hand, this has the effect that the projections 58 of the release arms 52, 54 turn upwards, and on the other hand, the locking arms 44 are drawn into the locking position.

Further, an additional tension spring may be provided between the lower, free ends of the locking arms 44, 46, pulling these against each other. Thereby, one avoids that the locking arms 44, 46 impact too strongly on the setting wheel 32 when the locking arms 44, 46 spring back, i.e. as soon as the control cam has slid down from the inner profile 60, and instead, they can spring back elastically.

Each one of the release arms 52, 54 has an arc-shaped slot 70, which surrounds the locking arm axle 48. This limits the turning angle of the release arms 52, 54 with respect to the locking arms 44, 46. In the figures, the locking arm axle 48 is always in the outer end area of this slot 70, i.e. the relative position of the locking arm to its release arm has not changed. However, in the return movement in the direction of the arrow 42, the relative position changes when the carrier cam 64 impacts on the outer profile 62 of the right hand release arm and turns this downwards, and consequently also the locking arm 44; in this movement, the related locking arm 44 remains engaged.

The spatial arrangement of the individual parts vertical to the plane of the drawing is as follows: the actuation lever is in the uppermost plane, i.e. at the greatest distance from the mount 24 at the base. The release arms 52, 54 are located below that, with a clearance upwards, and the radial cams 64 reach down to this level. Further down, the carriers 34, 36, the locking arms 44, 46, and the adjustment wheel 32 are on the same plane. The carriers 34, 36 are arranged above the carrier axle 40 at a distance from the activation lever, so that they can move without being obstructed by the radial cams 64.

As can be seen from FIG. 1, the abovementioned connection line 56 is a mirror symmetry axis of practically all parts, with the exception of the arm of the actuation lever 20. As the figures also show, it is possible to use relatively small, thus light-weight parts for the revolute joint, whereby the revolute joint as a whole can be built very small. It is characterized by very clean functioning. The adjustment wheel 32, which is developed as a pinion in the execution example shown, may also have any other tooth profiles, but the illustrated execution has the advantage that the pinion can also mesh with the toothing of an adjustable arm of the revolute joint.

At the lower end of the outer profile of each release arm 52, 54, a blocking projection 72 has also been provided which extends downwards into the level of the adjustment wheel 32. In the representation according to FIG. 1, it is located outside the outer circular line of the setting wheel 32. At the beginning of a forward movement in the direction of the arrow 38, when the release arm 52 is pressed into a circular path downwards and to the left, corresponding to the movement of the right hand radial cam 64, and shortly before the locking arm 44 is unlocked, it arrives in the movement range of the tooth profiles 28, 30. At this point, it has only one function, namely if, after the unlocking and due to a force occurring in the return flow path, the adjustment wheel 32 moves counterclockwise, i.e. in the intended adjustment direction. In this case, the rear tooth profile 30 impacts on the blocking projection 72 of the subsequent tooth, in the turning direction, whereby an additional free movement is prevented. Normally, however, the blocking projection 72 remains clear of the tooth profiles 28, 30; it does not obstruct other movement processes since, after the radial cam has slid off the inner profile 60 of the release arm 52, it is returned to a position outside the movement circle of the adjustment wheel 32 before it could obstruct the movement progress, see FIG. 3.

Starting with FIG. 1, a complete forward and back movement proceeds as follows: When the turning movement begins in the direction of the arrow 38, the projection of the right hand carrier 34 approaches the adjacent tooth profile 30, and simultaneously, the right hand radial cam 64 pulls the right hand release 52 obliquely to the left and down. Thereby, the right hand locking arm turns around its locking arm axle, whereby it slides along the tooth profile 30 and finally arrives in the release position. When this occurs, the projection of the right hand carrier 34 simultaneously impacts on the tooth profile 28, the status shown in FIG. 2.

When the movement is continued in the direction of the arrow 38, the projection of the right hand carrier will now transport the adjustment wheel 32 in a counterclockwise direction. As soon as a sufficient turning has been achieved, which makes it impossible to the right hand locking arm 44 to return to its old position, the radial cam 64 slides off the inner profile 60, whereby the locking arm 44 is no longer turned outwards but turns towards the adjustment wheel 32 under the affect of the tension spring 68.

In this position, it can as yet have no effect, thus, it does not influence the further turning movement of the adjustment wheel 32. However, as soon as it impacts on the tooth profile 30 of the subsequent tooth in the rotational direction, the rotational movement of the adjustment wheel 32 is stopped.

In this described forward movement, the left locking arm 46 has slid over a tooth of the adjustment wheel 32. Now begins the return movement in the direction of the arrow 42; in this movement stroke, the locking of the adjustment wheel 32 is retained. The right hand carrier 34 at first turns into the vicinity of the circle formed by the base of the adjustment wheel 32 and impacts on the tooth profile 30. At approximately the same time, the right hand radial cam 64 impacts on the outside profile 62 of the right hand release arm 52. The latter disappears downwards, so that the radial cam 64 returns to a position just in front of contact with the inner profile 60. Simultaneously, the right hand carrier 34 has turned clockwise and slid over the subsequent tooth. This reestablishes the position shown in FIG. 1.

The parts 32, 34, 36, 44, 46, 52, and 54 may be flat punched parts of sheet metal. As the figures show, parts with the same names are identical, i.e. the same for the right side and the left side.

What is claimed is:

1. A self-locking revolute joint that is adjustable at various angles by moving a hand lever back and forth, particularly for adjustment of seat height or inclination of backrest vehicle seats, the revolute joint comprising:
   a mount, in which a bearing shaft rests so that it can be turned, supporting an adjustment wheel provided with tooth profiles and having a rotation connection with an adjusting arm of the revolute joint,
   a turning axle around which the hand lever can be turned from a central position into two turning directions and which is located outside the adjustment wheel, the turning axle of the hand lever resting in the mount,
   said hand lever having two carriers which, in the central position of the hand lever do not engage with the adjustment wheel, one of said carriers engages into an adjacent tooth profile of the adjustment wheel when the hand lever is turned so as to move said adjustment wheel,
   each one of said carriers being joined with turning capability to the hand lever via a carrier axle around which the respective carrier can be turned without touching the tooth profiles of the adjustment wheel when the hand lever is in the central position, whereby a stop on the hand lever is assigned to and co-acts with each carrier, preventing the carriers from being turned under an action of an adjustment force applied to said hand lever and removed from the tooth profile of the adjustment wheel,
   two locking arms are provided, capable of moving on said mount which, when the hand lever is in the central position, the locking arms rest against tooth profiles of the adjustment wheel, locking it, and are disengaged when the hand lever is turned, each one of said locking arms has a locking effect only in one rotational direction but slides over the tooth profiles of the adjustment wheel in the other direction,
   two radial cams arranged on the hand lever, and
   a release arm for each locking arm of which one release arm always engages with one of the radial cams when the hand lever is turned out of the central position, whereby the release arm is brought along and disengages the locking arm which is locking in the applicable drive direction.

2. A self-locking revolute joint according to claim 1, whereby when the hand lever is in the central position, the carriers, the radial cams, the locking arms and the release arms are arranged in symmetry with respect to a connecting line between the turning axle and an axle of the bearing shaft.

3. A self-locking revolute joint according to claim 1, wherein each of said locking arm is a double arm having first and second arms, whereby the first arm forms the locking surface, while the respective second arm is jointly connected to the corresponding release arm.

4. A self-locking revolute joint according to claim 1, wherein when the hand lever is in its central position, each radial cam is at a small distance to an inner flank of a carrier projection of the release arm, which flank generally points to the bearing shaft, whereby, when the turning of the hand lever begins, one of the radial cams turns the locking arm around a bearing point by catching the carrier projection and, after release of the adjustment wheel, the one radial cam slides over the carrier projection, thereby rendering a self-activated locking of the locking arm possible after completion of the adjustment process.

5. A self-locking revolute joint according to claim 4, wherein the carrier projection has an outside flank which is developed so that the radial cam which engages with this outside flank in a non-adjusting return lift, can press the projection to the side and thus turn the release arm aside without influence on the locking arm so that the radial cam returns to the initial position relative to the inner flank of the carrier projection.

6. A self-locking revolute joint according to claim 1 including a blocking projection on the release arm, which, when the release arm is in the central inactive position is outside the outer circumference of the adjustment wheel and when the radial cam pulls the release arm, enters the movement path of the tooth profiles of the adjustment wheel when the locking arm is just released.

7. A self-locking revolute joint according to claim 6, wherein the release arms are interconnected by means of a tension spring, which engages at the level of the locking arm axle or below.

8. A self-locking revolute joint according to claim 1, wherein said carriers, locking arms, and adjustment wheel are located in the same plane and the radial cams and release arms are located in a common second plane.

9. A self-locking revolute joint according to claim 1, wherein a flank of each of the locking arms which is facing the adjustment wheel, is curved.

10. A self-locking revolute joint according to claim 1, wherein free ends of the two locking arms forming locking surfaces for the teeth are prestressed against each other by means of a tension spring.

* * * * *